United States Patent

Shigaki

[15] 3,646,271

[45] Feb. 29, 1972

[54] PCM RETIMING METHOD

[72] Inventor: Seiichiro Shigaki, Tokyo, Japan

[73] Assignee: Nippon Electric Company, Ltd., Tokyo, Japan

[22] Filed: Apr. 24, 1970

[21] Appl. No.: 31,567

[52] U.S. Cl. ....................175/15 BA, 179/15 BS, 179/15 BY

[51] Int. Cl. ..........................................................H04j 3/06

[58] Field of Search .......................179/15 BA, 15 BY, 15 BS

[56] References Cited

UNITED STATES PATENTS 3,042,751 7/1962 Graham.............................179/15 BS 3,461,245 8/1969 Johannes...........................179/15 BS

*Primary Examiner*—Ralph D. Blakeslee

*Attorney*—Sandoes, Hopgood & Calimafde

[57] ABSTRACT

A time division pulse multiplex communication system is disclosed for multiplexing pulse signals that are not synchronized. Several code groups are rotatively used to determine the state of "stuff," which governs whether the digits in a message are increased (or decreased) by one to restore synchronization.

7 Claims, 9 Drawing Figures

INVENTOR.
SEIICHIRO SHIGAKI

BY

Sandoe, Hopgood & Calimafde
ATTORNEYS

INVENTOR.
SEIICHIRO SHIGAKI

BY

Sandoe, Hopgood & Calimafde
ATTORNEYS

INVENTOR.
SEIICHIRO SHIGAKI

BY

Sandoe, Hopgood & Calimafde
ATTORNEYS

INVENTOR.
SEIICHIRO SHIGAKI

BY

Sandoe, Hopgood & Calimafde
ATTORNEYS

INVENTOR.
SEIICHIRO SHIGAKI
BY
Sandoe, Hopgood & Calimafde
ATTORNEYS

Patented Feb. 29, 1972

3,646,271

8 Sheets-Sheet 6

INVENTOR.
SEIICHIRO SHIGAKI
BY
Sandoe, Hopgood & Calimafde
ATTORNEYS

INVENTOR
Seiichiro Shigaki by

Sandoe, Hopgood & Calimafde
ATTORNEYS

*INVENTOR*
Seiichiro Shigaki
*by*
Sandoe, Hopgood & Calimafde
ATTORNEYS

PCM RETIMING METHOD

This invention relates to a PCM multiplexing system in which a plurality of nonsynchronous PCM signals encoded at independent end stations are multiplexed in a time division fashion and transmitted over a high-speed transmission line.

Multiplexing systems based on the so-called "stuff" method have hitherto been thought to be excellent. In the transmitter end of the conventional PCM multiplexing system, several signals of low-rank circuits with their respective clock frequencies being slightly differentiated from one another, are converted to a high-rank signal by a clock pulse train having a clock frequency higher than any of the clock frequencies of the low-rank circuits. The high-rank signal is then transmitted through the high-speed transmission line. As a result, redundant pulses correspondingly to the difference between the high-speed clock and the input low speed clock must be inserted into the high clock pulse train. This clock insertion operation is called a "stuff" operation.

Specifically, as examples of the conventional PCM multiplexing systems are the system shown in U.S. Pat. No. 3,136,861 entitled "PCM Network Synchronization" in the name of J. S. Mayo, and the system proposed by S. Kondo. The Kondo system (hereinafter referred to as the "K-system") is more excellent than the Mayo system (hereinafter referred to as the "M-system") with respect to protecting against the erroneous operation of the system, but is more complex than the M-system.

It is an object of the present invention to provide an improved PCM multiplexing system having a simple construction similar to that of the M-system, but which has a protection function similar to that of the K-system.

A PCM multiplexing system according to this invention is characterized in that each of the plural stuff information codes is a N-digit code (N being an integer greater than 2) at least one digit of which differs from each other, and that the stuff information is obtained by rotatively changing the stuff information codes from one code to another.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
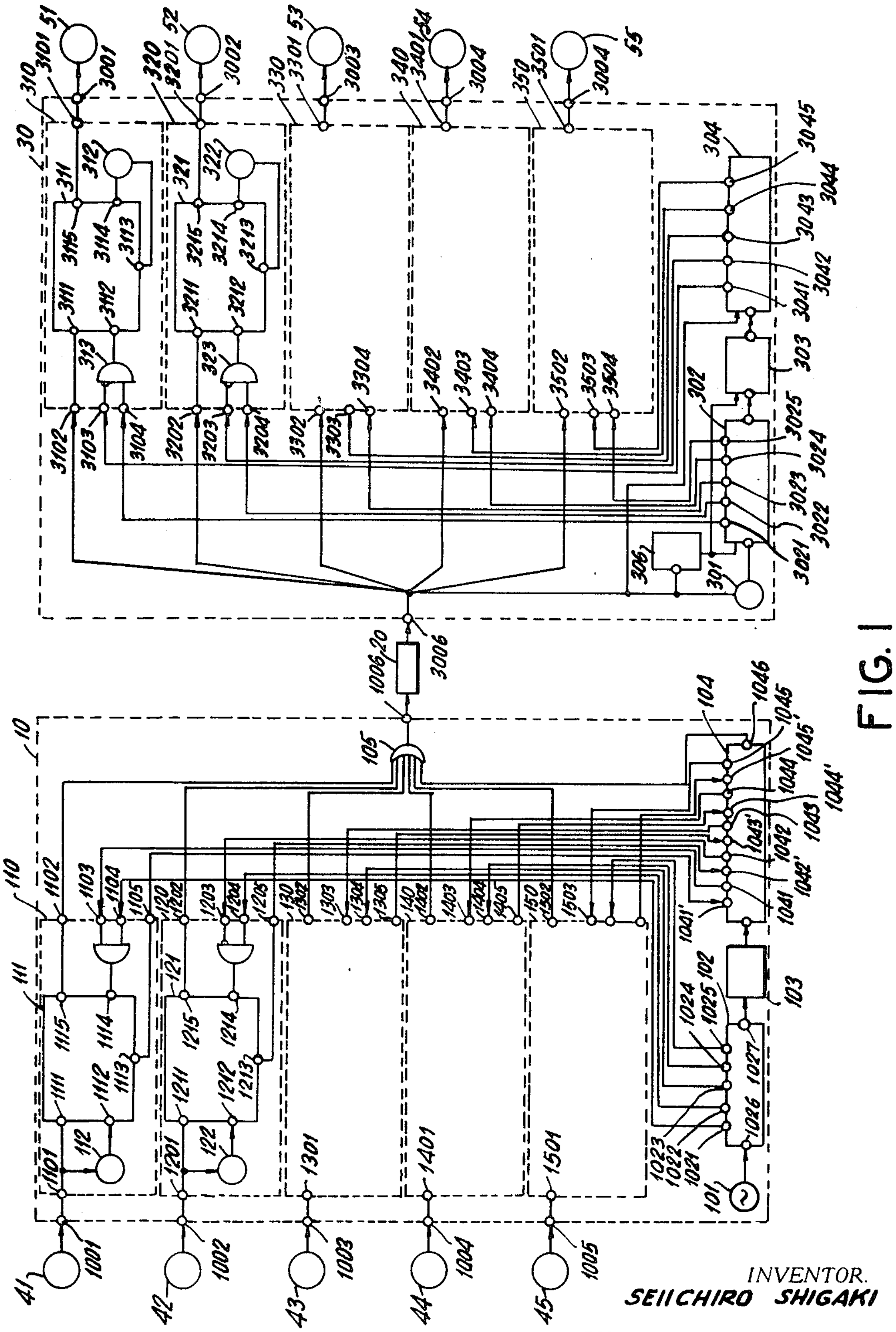
FIG. 1 is a block diagram of a conventional PCM multiplexing system.

Referring to FIG. 1, there is shown a block diagram of the M-system in which five signals of five low-rank circuits are multiplexed in a time division fashion and transmitted through a single high-speed transmission line. A transmission station 10 receives five mutually independent PCM signals from low-rank transmission end stations 41 to 45 at input terminals 1001 to 1005 respectively, and are multiplexed in time division fashion in station 10. The multiplexed signal is transmitted over a high-speed transmission line 20 to a receiving station 30 which receives the multiplexed signal, and separates this signal into the signals of the respective low-rank circuits.

Low-rank receiving end stations 51–55 are coupled to receiving station 30, and correspond to transmission end stations 41–45 respectively. In the transmission station 10, the numerals 110, 120, 130, 140 and 150 designate conversion circuits for the respective low-rank end stations; 101 is a clock oscillator for the high-speed multiplexed signal, and 102 is a frequency divider in which the frequency of the output clock of clock oscillator 101 is divided into one-fifth of the clock frequency. The clocks at the divided frequency are applied to the conversion circuits 110–150. A counter 103 produces a trigger signal showing the time positions of the frame codes by which the multiplexed high-speed signal is separated to five low-rank signals and at the same time the time positions of the stuff information codes can be detected at the receiving end stations. A control signal generator 104 generates the frame codes transmitted through a multiplexing gate 105 by using the trigger signal from counter 103, for generating the stuff control signals for each of the conversion circuits, and for transmitting the stuff information from each of the conversion circuits to the receiving station 30 via the multiplexing gate 105.

Referring to the conversion circuit 110 of the first low-rank circuit, an input terminal 1110 is connected to the transmission end station 41 and a clock-extracting circuit 112 extracts the clock pulse from the input signal which is given from the input terminal 1101. The input signal at a terminal 1111 is written into a memory circuit 111 by the use of the input clock at a terminal 1112, the memorized input signal is read out by the output clock at a terminal 1114 thereby delivering the output from a terminal 1115, and the stuff information is obtained at a terminal 1113 when the phase difference between the phase of the input clock pulse at terminal 1112 and that of the output clock pulse at terminal 1114 is below a certain value. It must be noted that since the period of the high-speed clock is selected to be shorter than that of the input clock for the low-rank circuit, the phase difference is continually being decreased. When the phase difference reaches a predetermined value, the stuff information is sent from terminal 1113 to control signal generator 104 which generates at the same time an inhibit pulse and inhibits the readout of the memory circuit 111 by means of an inhibit gate 113, whereby the phase difference is increased by one clock period of the high-speed clock.

Figure 4:
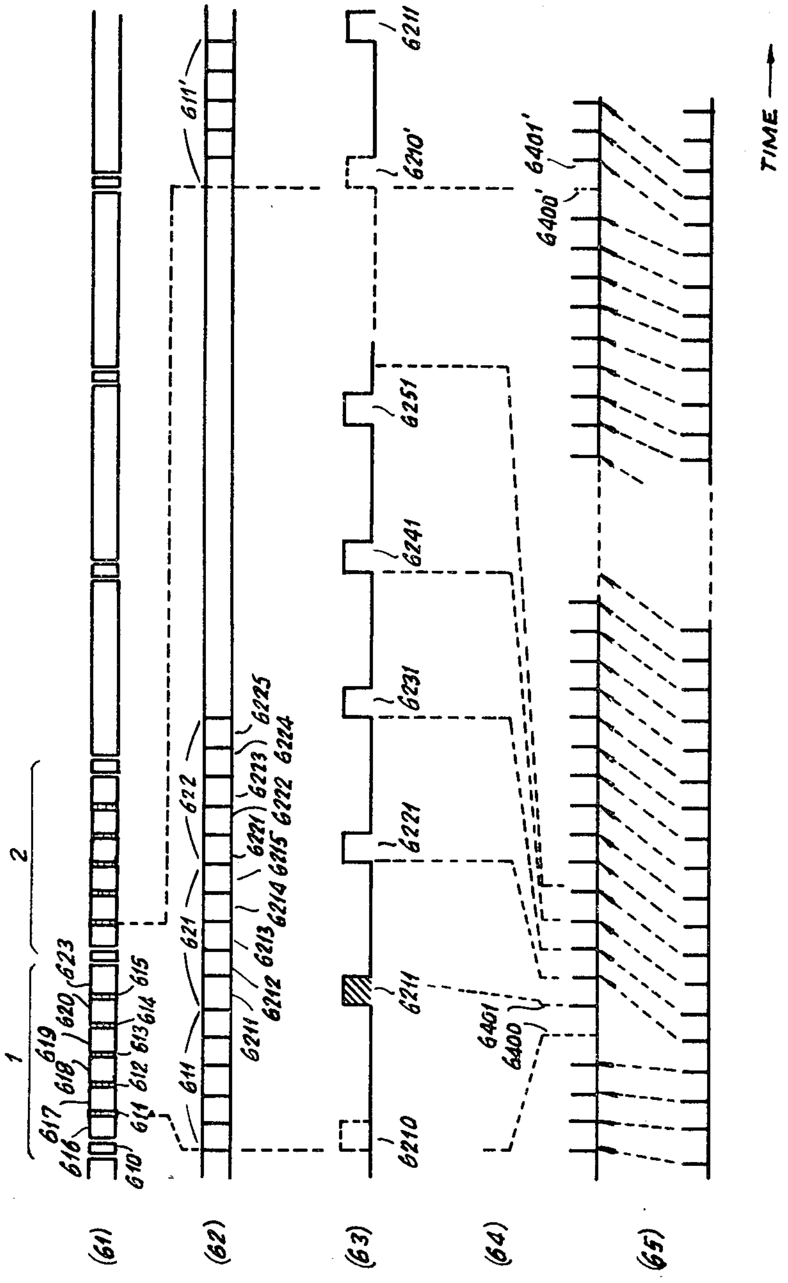
FIG. 4 shows waveform diagrams for the system of FIG. 1.

FIG. 4 illustrates the waveforms for explaining the operation of the system of FIG. 1. Numeral (61) is the waveform at output terminal 1006 and shows the composition of the multiplexed high-speed transmission signal; (62) is a diagram showing an enlargement of a part of waveform (61), and (63) and (64) illustrate the output waveform at terminal 1115 of memory circuit 111 for the first low-rank circuit; (65) is the input low-rank signal waveform at input terminal 1001. In waveform (61), 610 is a frame code for discriminating the low-rank circuit; 611 through 615 are the stuff information codes of the first to fifth low-rank circuits respectively; and 616 through 620 and 623 are information codes from the low-rank circuits. One frame consists of codes 610, 616, 611, 617,. . . 615, and 623. By detecting the position of the frame code 610 in the receiving station, the stuff information codes at the first through fifth circuits can be discriminated. In the waveform (62), the stuff information 611 is a five-digit code, and the subsequent low-rank circuit information code 617 consists of the five-digit codes 621, 622,. . .. For example, each bit of the first through fifth bits 6211 through 6215 of code 621 are utilized to transmit one digit of the respective information codes of the first through the fifth circuits respectively.

For example, the pulses corresponding to the first low-rank circuit only are shown in (63). In (63), the position of pulse signal 6210 is used for the stuff information code transmission. The waveform (64) is illustrated by reducing the time axis of (63). According to the phase difference between the low-rank clock and the high-speed clock, when the redundant pulse must be inserted, the stuff information code at the time position of signals 6210 or 6400 is "1", for example, and the redundant pulse is inserted at the time position of signals 6211 or 6401. On the other hand, when it is unnecessary to insert the redundant pulse, the stuff information code is "0", and an information digit is transmitted at the succeeding time position of signal 6211 or 6401. The broken lines extending between (65) and (64) show the correspondence between the input low-rank signal and the high-speed transmission signal. It is apparent from this correspondence that the information is not sent at the point of signal 6401 at which "stuff" occurs, whereas the information is sent at signal 6401′ at which stuff does not occur.

In FIG. 1, the operation of receiving station 30 is the reverse of that of transmission station 10. A clock-extracting circuit 301 extracts the clock from the high-speed transmission line signal; 302 is a frequency divider similar to frequency divider 102, and counter 303 is similar to counter 103 in the transmission station. A synchronizer 306 generates a timing pulse for the frequency divider 302 and the counter 303; and a control signal generator 304 is similar to 104. The control signal generator 304 generates the inhibit pulses according to the stuff information which is obtained from the counter 303. In a conversion circuit 310 in the receiving station, 313 is an inhibit gate similar to gate 113 and 311 is a memory circuit similar to memory circuit 111, in which only the information sent from the transmission end station 41 is written by means of the clock obtained from the inhibit gate 313. A clock oscillator 312 has its phase controlled by the integration of the phase difference signal detected in the memory circuit 311. The readout of memory circuit 311 is performed by the output of clock oscillator 312. Thus, the stuff information codes and the "stuff" pulses (redundant pulses) are eliminated, and the smoothed output pulse which is the same as that at the input terminal 1001 is obtained at an output terminal 3001 of the first low-rank circuit.

Now each waveform at the receiving side will be explained by referring to FIG. 4, wherein: (61) and (62) are input signal waveforms at the terminal 3006; (63) and (64) are output waveforms of the gate 313; and (65) is a waveform at terminal 3001 although the time relationship between (64) and (65) is not correct in this case.

Figure 2:
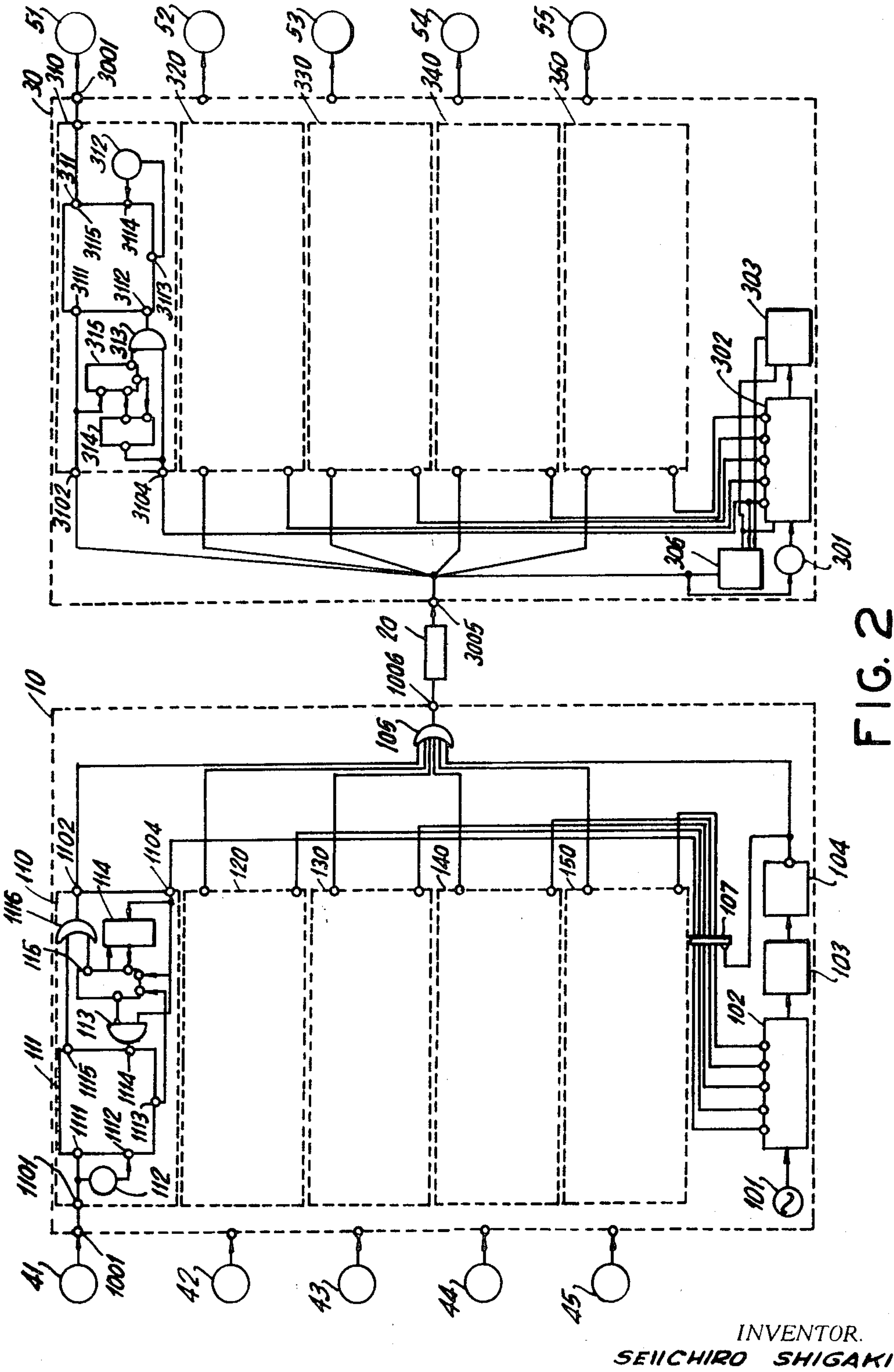
FIG. 2 is a block diagram of another conventional PCM multiplexing system.

FIG. 2 is a block diagram of the K-system in which five low-rank signals are multiplexed in a time division fashion and are transmitted through a single high-speed transmission line. The K-system differs from the M-system mainly in that the time positions of the stuff information codes and "stuff" pulses are not in synchronism with those of the frame pulses. Therefore, each of the conversion circuits is provided with the function of the "stuff" operation, and the control signal generator has only the function of generating the frame codes by using the trigger signal from the counter 103. For example, in the conversion circuit 110 114 is a stuff frame counter; and 115 is a stuff frame code generator. At the time position designated by the stuff frame counter 114, the phase difference information between the low and high clocks from the memory is observed. When the stuff is unnecessary, the stuff frame code is immediately generated without inserting any redundant pulses before the stuff frame code. When the stuff is necessary, a redundant pulse is inserted into the high-speed pulse train, and the stuff frame code is then generated. During this operation, readout of information from memory circuit 111 and counting of stuff frame counter 114 are stopped.

Similarly on the receiving side, a stuff frame code detector 315 is provided corresponding to a stuff frame code generator 115. During the period in which the stuff frame code is detected from the input pulse train delivered from terminal 3102 by the use of the stuff frame counter 314, counting of the frame counter 314, and writing of the information into memory circuit 311 are stopped. When stuff is done in the transmission station, the stuff frame code position is delayed by one digit so that the stopping duration of the counter 314 and writing into the memory circuit 311 becomes longer by one digit.

Figure 5:
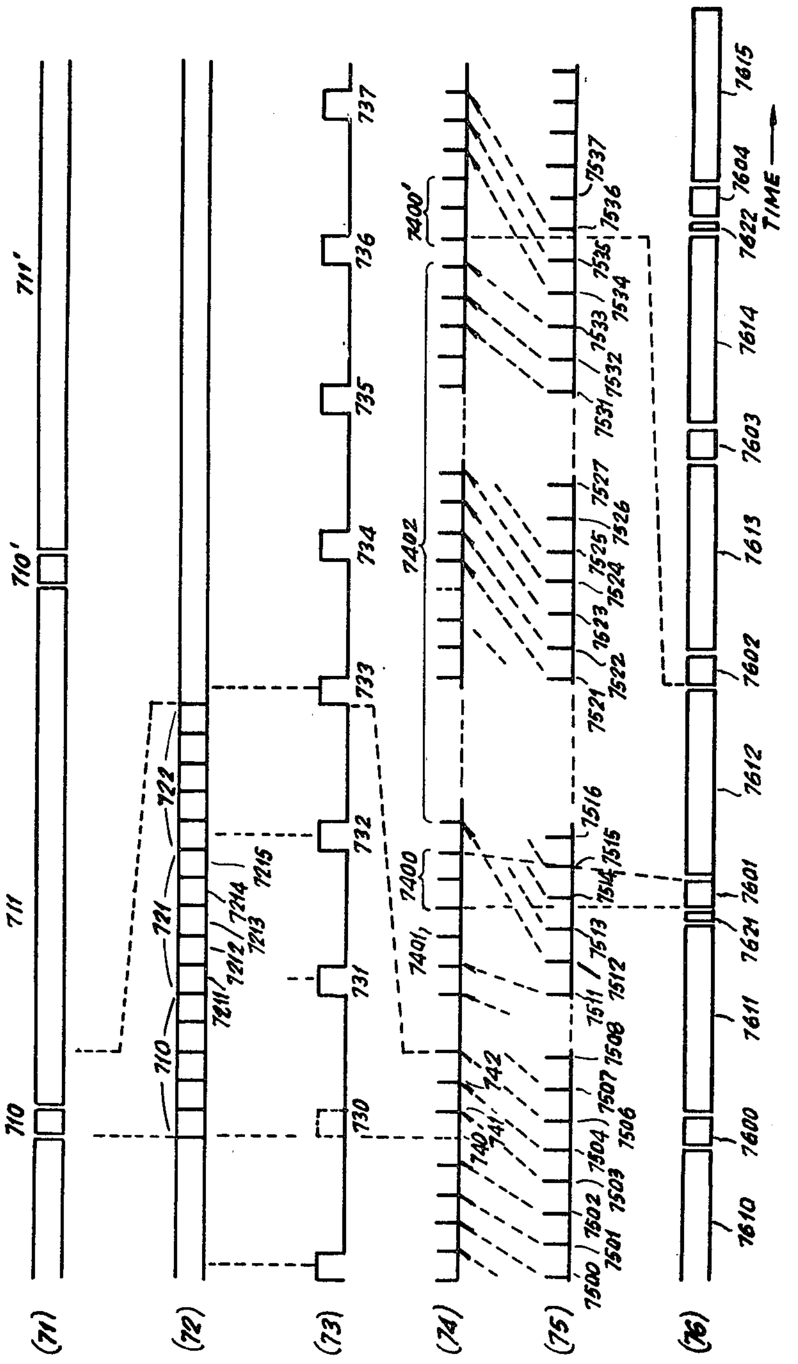
FIG. 5 shows waveform diagrams for the system of FIG. 2.

FIG. 5 illustrates the waveforms for explaining the operation of the K-system of FIG. 2. In FIG. 5, (71) is a multiplexed high-speed transmission signal. Since the stuff information is contained on each low-rank circuit signal, the high-speed transmission signal has the frame codes 710 for separating the low-rank circuits and the subsequent information codes 711. (72) is an enlargement of a part of (71). Similar to (62) of FIG. 4, (72) comprises five-digit codes 721, 722, etc.. In code 721, 7211 through 7215 show the information digits of the first through the fifth low-rank circuits. (73) is the waveform drawn by extracting the positions of the first low-rank circuit signals from (72), and (74) is a diagram formed by contracting the time axis of (73). Similarly as in the M-system, one digit of space exists only in the portion used for the framing pulse of the high-speed transmission signal. The stuff frame in the case of the M-system, as described above, is not in synchronism with the main frame. One of the stuff frames consists of a stuff frame code 7400 which is a three-digit code in this example and information code 7402 having a predetermined code length. In the case of stuff, a space position signal 7401 becomes a one-digit space. (75) is a low-rank signal pulse train. The broken lines extending between pulse trains (74) and (75) show the correspondence between the low-rank signal and the high-speed transmission signal. (76) is a diagram derived by further contracting the time axis of pulse train (74). The code train (76) consists of the stuff frame codes 7600, 7601, 7602, 7603 and 7604, and the information codes 7610, 7611 through 7615 with a predetermined code length, and stuff spaces 7621 and 7622 which are to be inserted when "stuff" occurs. In correspondence with FIG. 2, the high-speed transmission signal (71) and (72) are the pulse trains at terminals 1006 and 3006; (73) is the signal at the output terminal of gate 113 or 313; (74) and (76) are the signals at the output terminal of gate 116; and (75) is the signal at terminals 1001 or 3001.

Figure 3:
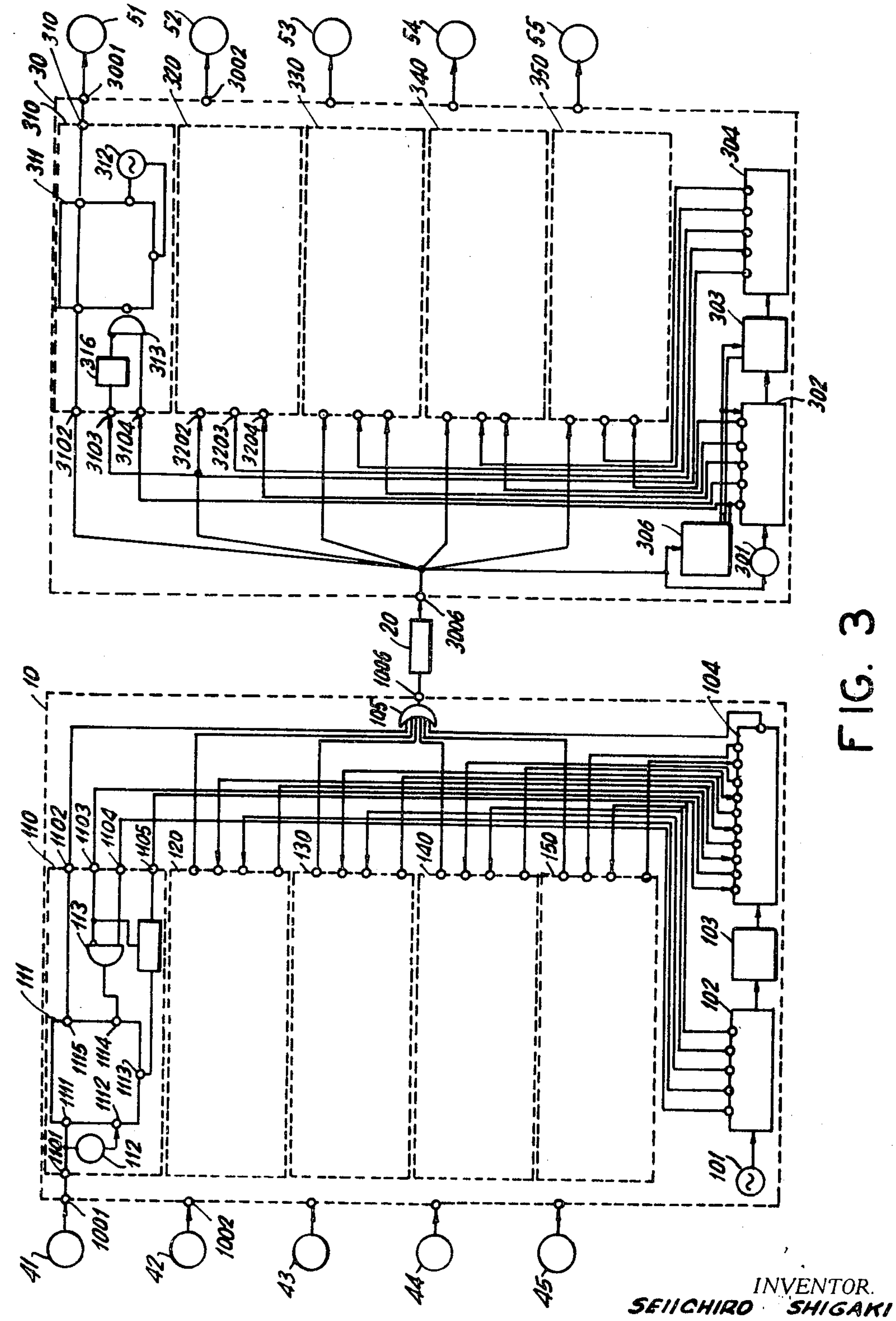
FIG. 3 is a block diagram of an embodiment of the PCM multiplexing system according to this invention.

FIG. 3 is a block diagram of a PCM multiplexing system according to this invention. This system is similar to that shown in FIG. 1, except that stuff information position counters 116, 316 are installed in the conversion circuits, and that the method of the stuff information transmission differs from that of both the M-system and K-system.

Figure 6:
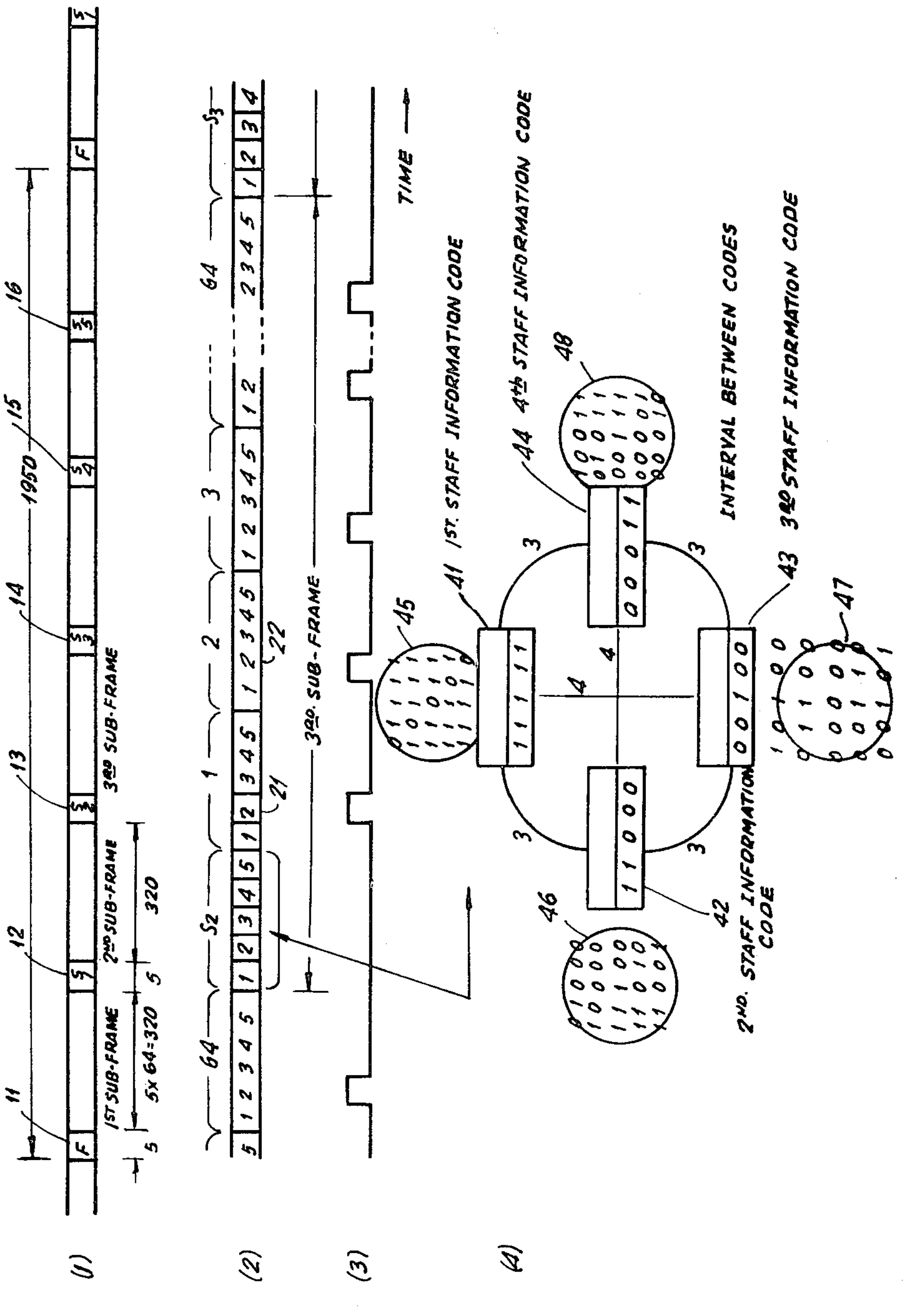
FIG. 6 is a waveform diagram for the system of the embodiment shown in FIG. 3.

FIG. 6 illustrates the waveforms for explaining the operation of the system of FIG. 3. The frame construction method of the stuff and the time position of the stuff information transmission are the same as in the M-system. In FIG. 6, (1) is a frame construction of the multiplexed high-speed transmission signal. The period of the main frame for the low-rank circuit separation is coincident with an integral multiple of that of the stuff frame. In this example, one main frame consists of the main frame code 11 (five digits) used for the lower rank circuit discrimination, and six stuff frames each of which consists of the information codes (320 digits) and stuff information codes being one of codes 12 to 16 (five digits). For example, the third stuff frame consists of the stuff information code 13 (five digits) and 64 codes. Each of the codes is a five-digit code which respectively represents the information digit of one of the five low-rank signals.

Between the stuff information code of a certain low-rank circuit in a certain main frame and the stuff information of the same low-rank circuit in the following main frame, there are 384 (=64×6) time positions into which information digits of the same low-rank circuit can be transmitted. For example, the time positions employed by the second low-rank circuit is shown by (3) in FIG. 6.

The stuff operation is carried out by using one time position among the 384 available time positions as the stuff position. Therefore, when the stuff is unnecessary, the number of the information digits transmitted in one main frame is 384 per one low-rank circuit, whereas when the stuff is necessary, that number becomes 383 per one low-rank circuit. The stuff information code 13 shown in (1) of FIG. 6 transmits the information indicating whether the stuff operation for the second low-rank signal is performed or not in the transmission station. Similarly, the codes 12, 14, 15 and 16 are used as the stuff information codes for the first, third, fourth and fifth low-rank signals, respectively. The time position for the stuff in one low-rank circuit is a succeeding time position to the stuff information code. For example, in the second low-rank signal shown in (2) or (3) of FIG. 6, the stuff position is at 21. This stuff position is "space" when the stuff occurs. On the contrary, this stuff position is a one information digit when no stuff occurs.

According to this invention, several different code groups are used as the stuff information code and, at the time points where stuff occurs, the different code groups are rotatively employed. Assume to illustrate this rotative use of code groups, that five digits are assigned to the stuff information code as in the system illustrated in FIG. 3. By the use of a five-digit binary code, 25 or 32 pieces of stuff information codes can be considered. When one digit error of the stuff information code is permitted and corrected, four stuff information codes, three or more digits of which differ from each other, are selected as "11111", "11000", "00100" and "00011", for example, and the stuff information is obtained by rotatively changing the stuff information code from one code to another. These stuff information codes are represented by 41, 42, 43, and 44 in FIG. 6. Assume that stuff information codes 41–44 are called respectively the first to fourth stuff information codes; that any one of the first to fourth stuff information codes is sent from the transmission station; and that in the receiving station, as described, one digit error out of five digits, which error is caused by the code error of the transmission line, can be corrected. When the first stuff information code 41 or a code in the code group 45 which differs from information code 41 by one digit is received, it is judged that the first stuff information code has been sent out from the transmission station. In the same manner, when the code groups 46 through 48 containing codes in which one digit differs from the second through fourth stuff information codes 42–44 respectively are received, it is judged that the second through the fourth stuff information codes have been sent out from the transmission station. Therefore, correct transmission of the stuff information codes can be carried out as long as two or more codes are not mistaken out of the five available codes.

At the transmission station, conversion circuits for the respective low-rank circuits are provided with stuff information code indication counters (such as counter 116 in FIG. 3) which are arranged so that the indications of the respective counters (quarternary counters in this case) correspond respectively to the first through the fourth stuff transmitted information codes. Counter 116 is operated so that the indication is changed rotatively at the times that the stuff occurs. Thus, via the high-speed transmission line, the first stuff information code "11111", the second stuff information code "11000", the third stuff information code "00100", the fourth stuff information code "00011", and the first stuff information code "11111" are transmitted successively.

At the receiving station, conversion circuits for the respective low-rank circuits are provided with stuff information code indication counters in correspondence with the transmission station (such as counter 316 in FIG. 3). A stuff information code discriminator 304 is installed for judging which stuff information code is being sent from the transmission station, and for providing this information to the stuff information code indication counters of the corresponding low-rank circuits.

Thus, when the stuff information code indicated by the stuff information code indication counter of the low-rank circuit up to the previous frame is the same as the stuff information code which is newly sent therein, it is judged that stuff has not been carried out at the transmission side, and that counter continues to provide the same indication. If the newly sent stuff information code is advanced by one code with respect to the stuff information code up to the previous frame, it is judged that stuff is carried out at this frame. Thus the stuff information code indication counter is advanced by one code, and the stuff operation is instructed. When the newly sent code is neither the code up to the previous frame of the low-rank circuit, or the code advanced by one code, it is judged that this is due to the code error of more than one digit of the stuff information code by the transmission line. In this case, the counter is kept waiting for the stuff information code of the next frame.

Figure 7:
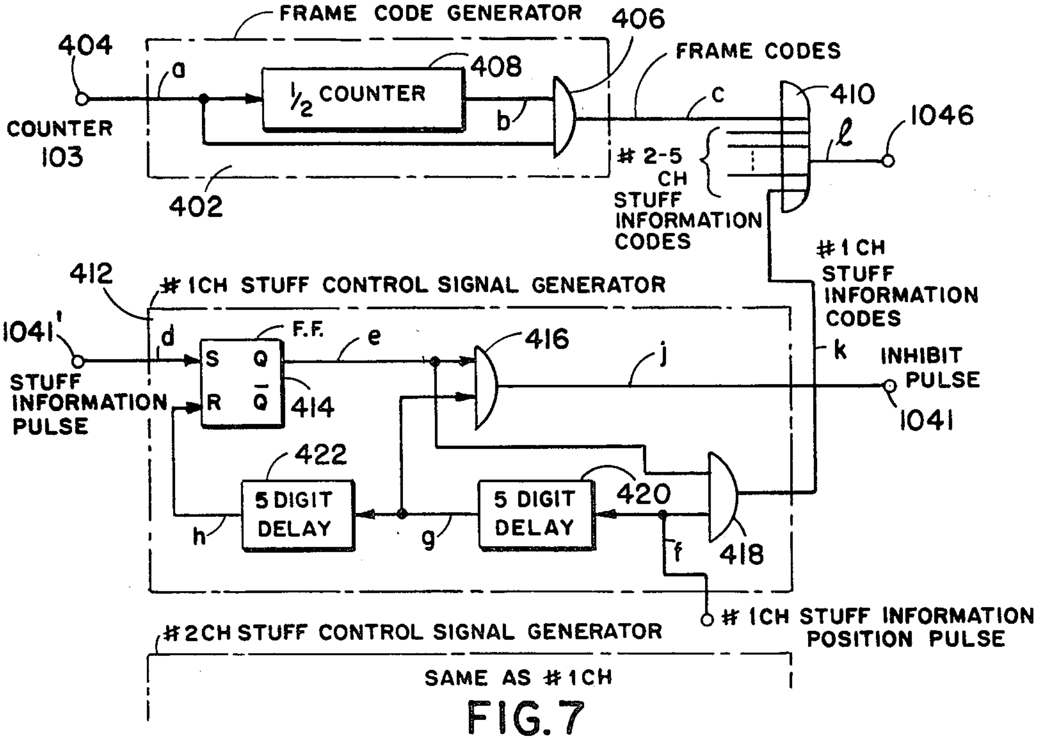
FIG. 7 is a schematic diagram of the control signal generator of the system of FIG. 3.
Figure 8:
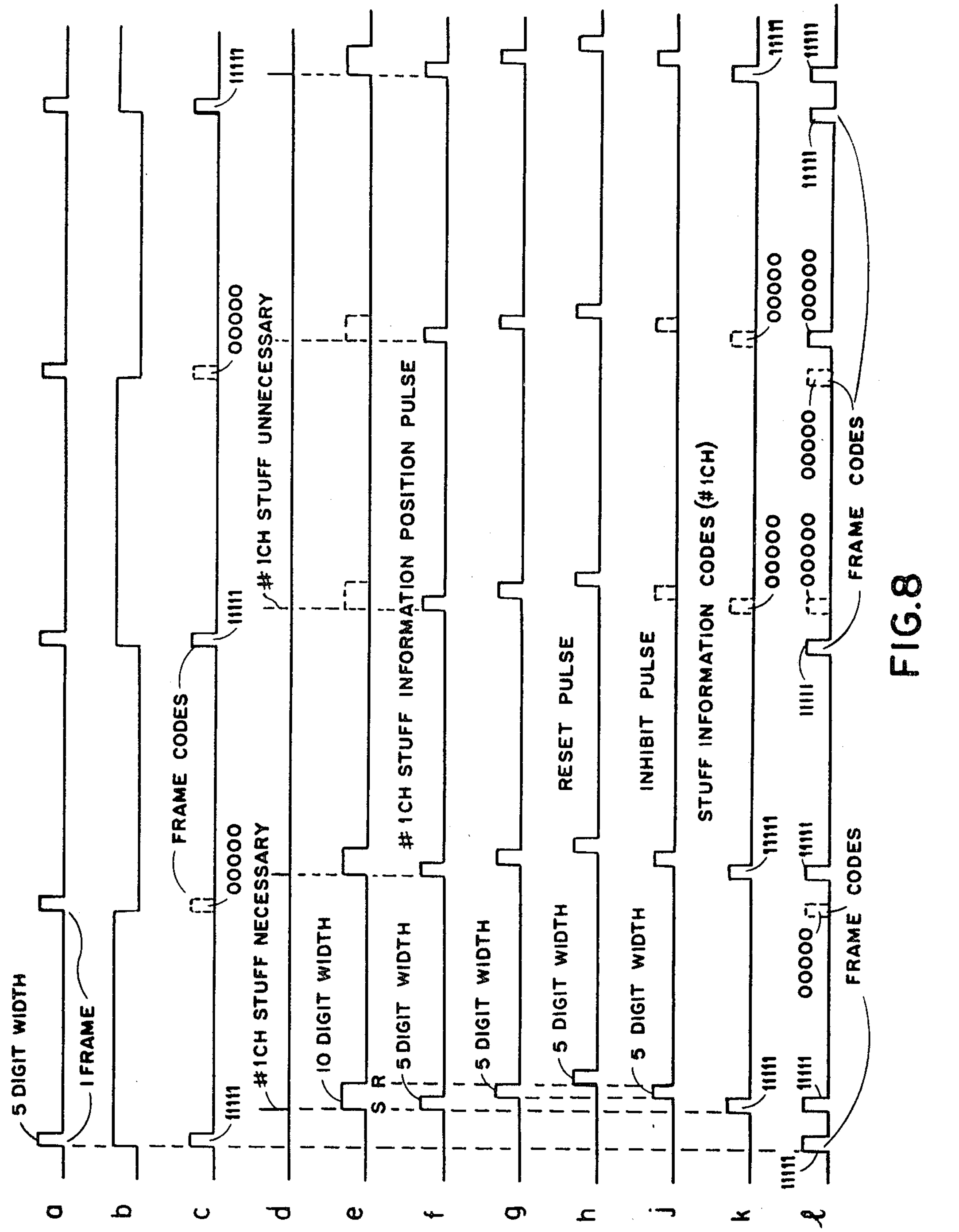
FIG. 8 is a waveform diagram illustrating the various signals developed and utilized in the signal generator of FIG. 8.

FIG. 7 schematically illustrates an exemplary circuit for use as the control signal generator 104 of the the system of FIG. 3. The waveforms identified by the letters *a*–1 in FIG. 8 are those occurring at the similarly designated points in FIG. 7, and FIG. 8 shows waveforms for that circuit. It is assumed that the five-digit frame codes which have alternate repetition of "11111" and "00000" at the frame repetition rate as shown in FIG. 8–*c* are used in this circuit; and that the stuff information code is "11111"b when the stuff is necessary, and the code is "00000" when the stuff is unnecessary. The stuff information pulse (FIG. 8*d*) is obtained by the memory circuit 111 as described below with respect to FIG. 9. The stuff information position pulses indicates the period (five-digit width in this case) in which the stuff information code pulses must be inserted. This period corresponds to the period 611 of waveform (64) of FIG. 4 in the case of one channel or low-rank circuit. Actually, in the output pulse train (at output terminal 1046) No. 2–No. 5 channel stuff information pulses are included. In FIG. 81, however, those pulses are not shown for simplicity.

Control signal generator 104 comprises a frame code generator 402 which receives a signal at an input node 404 from counter 103. That signal shown at FIG. 8*a* is passed directly to one input of an AND-gate 406 and to a counter 408 whose output, shown in FIG. 8*b*, is applied to the other input of gate 406. The output of gate 406 (FIG. 8*c*) is applied to one input of an OR-gate 410. Gate 410 also receives inputs from the No. 1–No. 5 CH stuff control signal generators only one of which, No. 1CH generator 412, is illustrated in FIG. 7. The output of gate 412 (FIG. 81) is connected to terminal 1406 which defines the output of generator 104.

Stuff control generator 412 comprises a flip-flop 414 which receives a set pulse from terminal 1041 in the form (FIG. 8*d*) of a stuff information pulse. The high or Q-output of flip-flop 414 (FIG. 8*e*) is applied to one input of an AND-gate 416, the output of which (FIG. 8*j*) defines an inhibit pulse at terminal 1041.

The output of flip-flop 414 is also applied to one input of an AND-gate 418, which receives the No. 1 CH stuff information position pulse (FIG. 8*f*) at its other input. The output of gate 418 (FIG. 8*k*) is applied as one input to gate 410. The stuff information position pulse is also applied to a five-digit delay 420 which produces a delayed pulse (FIG. 8*g*). That delayed pulse is applied to the other input of gate 416. The delayed pulse is further applied to a second five-digit delay 422, the output of which (FIG. 8*h*) is applied to the reset terminal of flip-flop 414.

Figure 9:
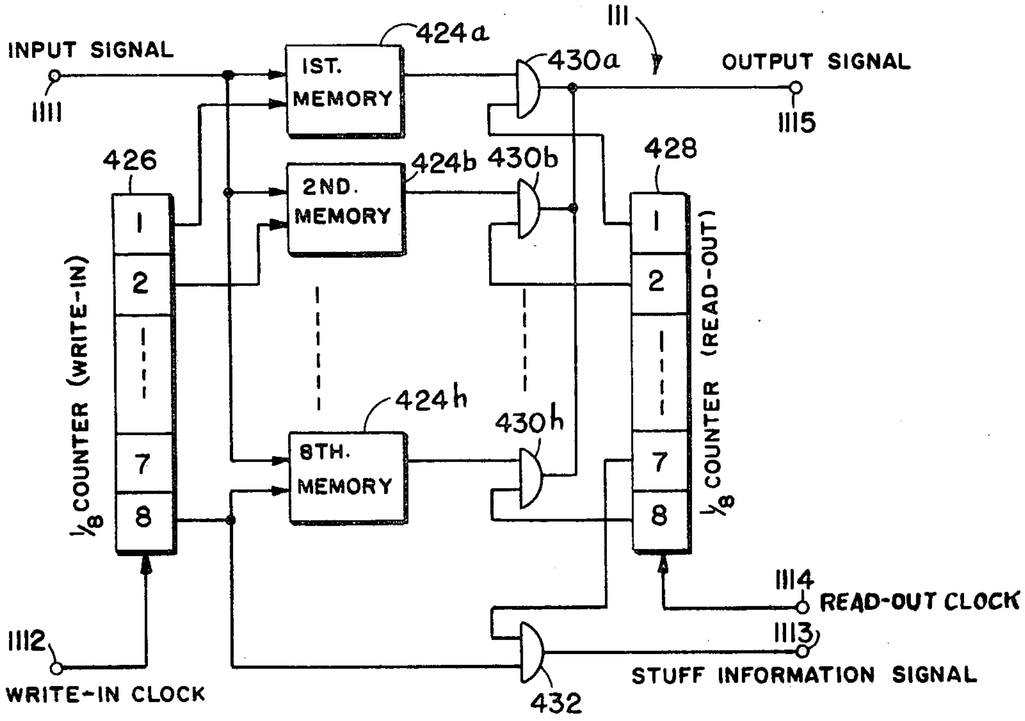
FIG. 9 is a schematic diagram of the memory circuit of the system of FIG. 3.

FIG. 9 schematically illustrates an exemplary memory circuit 111 for use in the system of FIG. 3. That circuit as herein shown may comprise memories 424*a*–424*h*, and two ⅛ counters 426 and 428 (countdown) provided at the "write-in" side and "readout" side respectively for generating the write-in and readout pulses. The repetition rates of these counters are equal to one-eighth of that of the write-in and readout clock pulses, respectively. Counters 426 and 428 respectively receive write-in and readout clock signals from terminals 1112 and 1113 respectively. Each of memories 424*a*–424*h* receives an input signal from terminal 111, and each respectively receives a signal from one of the eight stages of input counter 426. The outputs of memories 424*a*–424*h* are respectively applied to AND-gates 430*a*–430*h*. The other inputs to gates 430*a*–430*h* are respectively received from each stage of output counter 438.

AND-gates 430 thus read out the contents of the first to eighth memories 424*a*–424*h* in response to the readout pulses from the ⅛ counter 428 at the "readout" side. An AND-gate 432 generates the stuff information pulses at terminal 1113 by adding the eighth write-in pulses from the eighth element of the "write-in" counter 426 to the seventh readout pulses from the seventh element of the "readout" counters 438. As is well known, the phase differences of the write-in (or readout) pulses between the adjacent elements of ⅛ counters 426 and 428 are equal to the periods of the write-in (or readout) pulses, and the eight elements of the ⅛ counter generate the write-in (or readout) pulses successively and rotatively (as 1 → 2 → 3- -- → 8 → 1 → 2 →--).

Since the frequency of the readout clock pulses is higher than that of write-in clock pulses, there are time positions at which the phase of the write-in pulse of the eighth element of the "write-in" counter is equal to that of the readout pulse of the seventh element of the "readout" counter. At those time positions, therefore, the stuff information signals are delivered from the terminal 1113 via AND-gate 432.

A specific frame composition and stuff information code composition have heretofore been described herein. From this description it is to be clearly understood that the stuff information transmission method of this invention in which different codes are rotatively utilized as the stuff information, and also the variation in stuff information codes is used as the stuff information, is applicable to all the multiplexing system based on the M-method.

By applying the system of this invention as has been explained, an excellent synchronous characteristic which is substantially the same as that of the K-method shown in FIG. 2, can be obtained by the use of a device of simple structure substantially similar to the M-method shown in FIG. 1.

Thus while only a single embodiment of the invention has been herein specifically described, it will be apparent that variations can be made therein all without departing from the spirit and scope of the invention.

I claim:

1. A PCM multiplexing system for multiplexing a plurality of low-rank PCM signals in time division fashion and transmitting the multiplexed signal in the form of a high clock pulse train through a transmission line, said multiplexed signal including a plurality of stuff information codes for obtaining stuff informations indicating that redundant pulses are inserted to said high clock pulse train corresponding to the phase differences between the high-speed clock of said high clock pulse train and the input low speed clocks of said low-rank PCM signals, the number of said stuff information codes being greater than two; each of said stuff information codes being in the form of N-digit codes (wherein N is an integer greater than 2) at least one digit of which differs from each other; said system comprising means for rotatively changing said stuff information codes from one to another in a predetermined order whenever said stuff informations are transmitted through the transmission line.

2. A PCM transmission system in which a plurality of nonsynchronous encoded PCM signals from a respective plurality of circuits are multiplexed, said system comprising means for providing several different stuff information code groups containing a plurality of information digits and a plurality of stuff digits, means for transmitting one less information digit when stuff occurs, whereby the number of the information code contained in one retiming frame is decreased (or increased) by one digit, thereby establishing clock synchronization with a nonsynchronous PCM signal, and counting means for counting the multiplexed circuit frames which serve as the frame for separating said plurality of circuits and also as the retiming frame of each said circuits.

3. The system of claim 2, further comprising a plurality of rank circuits to be multiplexed, retiming means for each of said rank circuits including first storage means, control means for said retiming means, said retiming means including output clock-extracting means providing a first repetition frequency, second storage means, means for reading in the respective rank circuit signals into said second storage means in accordance with a first repetition frequency, output clock means providing a second repetition frequency greater than said first repetition frequency, and means for reading out the respective rank circuit signals in accordance with a said second repetition frequency.

4. The system of claim 3, further comprising a frame code generator for transmitting frame codes to a gate within the transmission time of a specific frame code, and stuff controller means to provide an inhibiting pulse to stop reading information from each of said lower rank circuits to the multiplexed gate when stuff is necessary.

5. The system of claim 4, further comprising stuff position counters for each of said retiming means, means for providing a retiming frame including means for providing a framing pulse, means for providing a plurality of subframes, each of said subframes comprising a data pulse to identify circuit rank and information code pulses, said stuff information determining whether one of said information code pulses is to be used as a space, the indication of each of said counters corresponding to one of said stuff information code groups, and means for rotatively advancing said counters in order whenever stuff occurs.

6. The system of claim 5, further comprising receiving means including means for detecting and identifying the transmitting stuff pulse group, means for determining when stuff occurs by using a plurality, but not all of said stuff digits, stuff code discriminating means, and means for advancing said discrimination means to a new stuff code at each occurrence of stuff.

7. The system of claim 6, further comprising stuff code position indicating means responsive to said discriminating means, whereby if the newly sent information code is advanced by one in comparison with the stuff information code discriminated in the previous frame, the stuff position indicating means is advanced by one code and produces stuff action, and whereby if the newly sent code is neither the previous code, nor the code advanced by one, no reaction occurs and it is determined that an error in transmission has occurred.

* * * * *